United States Patent
Sinclair et al.

[11] Patent Number: 5,837,656
[45] Date of Patent: Nov. 17, 1998

[54] WELL TREATMENT FLUID COMPATIBLE SELF-CONSOLIDATING PARTICLES

[75] Inventors: A. Richard Sinclair; Richard L. Johnson, II, both of Houston, Tex.; Richard A. Rediger, Newark, Ohio; Van T. Smith, Houston, Tex.

[73] Assignees: Santrol, Inc., Houston, Tex.; Georgia-Pacific Resins, Inc., Atlanta, Ga.

[21] Appl. No.: 611,170

[22] Filed: Mar. 5, 1996

Related U.S. Application Data

[63] Continuation of Ser. No. 278,388, Jul. 21, 1994, abandoned.

[51] Int. Cl.$^6$ ............... C09K 7/00; B05D 7/00; E21B 43/26
[52] U.S. Cl. ............... 507/220; 507/219; 507/924; 427/214; 166/280
[58] Field of Search ............... 507/923, 220, 507/219, 924; 427/214; 166/280

[56] References Cited

U.S. PATENT DOCUMENTS

| | | | |
|---|---|---|---|
| Re. 34,371 | 9/1993 | Rumpf et al. | 501/128 |
| 3,393,736 | 7/1968 | Goodwin | 166/12 |
| 3,404,735 | 10/1968 | Young | 166/33 |
| 3,419,073 | 12/1968 | Brooks | 166/33 |
| 3,492,147 | 1/1970 | Young | 117/62.2 |
| 3,625,287 | 12/1971 | Young | 166/295 |
| 3,929,191 | 12/1975 | Graham | 166/276 |
| 4,073,343 | 2/1978 | Harnsberger | 166/295 |
| 4,113,916 | 9/1978 | Craig | 428/404 |
| 4,413,931 | 11/1983 | McDonald | 405/264 |
| 4,439,489 | 3/1984 | Johnson | 428/404 |
| 4,443,347 | 4/1984 | Underdown | 252/8.55 R |
| 4,469,517 | 9/1984 | Cooke | 106/38.3 |
| 4,493,875 | 1/1985 | Beck et al. | 428/403 |
| 4,518,039 | 5/1985 | Graham | 166/276 |
| 4,522,731 | 6/1985 | Lunghofer | 252/8.55 R |
| 4,527,627 | 7/1985 | Graham | 166/280 |
| 4,552,815 | 11/1985 | Dreher et al. | 428/415 |
| 4,553,596 | 11/1985 | Graham | 166/295 |
| 4,555,493 | 11/1985 | Watson et al. | 501/127 |
| 4,564,459 | 1/1986 | Underdown | 252/8.55 R |
| 4,581,253 | 4/1986 | Evans | 427/221 |
| 4,585,064 | 4/1986 | Graham | 166/280 |
| 4,597,991 | 7/1986 | Graham | 427/214 |
| 4,658,899 | 4/1987 | Fitzgibbon | 166/280 |
| 4,680,230 | 7/1987 | Gibb et al. | 428/403 |
| 4,694,905 | 9/1987 | Armbruster | 166/280 |
| 4,717,594 | 1/1988 | Graham | 427/214 |
| 4,732,920 | 3/1988 | Graham | 523/145 |
| 4,848,470 | 7/1989 | Korpics | 166/312 |
| 4,869,960 | 9/1989 | Gibb et al. | 428/405 |
| 4,879,181 | 11/1989 | Fitzgibbon | 428/402 |
| 4,888,204 | 12/1989 | Tutt | 427/53.1 |
| 4,894,285 | 1/1990 | Fitzgibbon | 428/402 |
| 4,921,820 | 5/1990 | Rumpf et al. | 501/128 |
| 4,921,821 | 5/1990 | Rumpf et al. | 501/128 |
| 4,929,648 | 5/1990 | Armbruster | 523/147 |
| 4,977,116 | 12/1990 | Rumpf et al. | 501/128 |
| 5,030,603 | 7/1991 | Rumpf et al. | 501/127 |
| 5,120,455 | 6/1992 | Lunghofer | 252/8.551 |
| 5,188,175 | 2/1993 | Sweet | 166/280 |
| 5,422,183 | 6/1995 | Sinclair et al. | 428/403 |
| 5,597,784 | 1/1997 | Sinclair et al. | 507/219 |

FOREIGN PATENT DOCUMENTS

| | | |
|---|---|---|
| 1217319 | 2/1987 | Canada . |
| 0116369 | 8/1984 | European Pat. Off. . |
| 0308257A2 | 3/1989 | European Pat. Off. . |

*Primary Examiner*—Philip Tucker
*Attorney, Agent, or Firm*—Arnold White & Durkee

[57] ABSTRACT

An improved resin coated particle comprises a particulate substrate, an inner coating of a curable resin and an outer coating of a substantially cured resin. These improved resin coated particles are produced by first coating the substrate with a reactive resin. A second or outer coating of a resin is then coated over the inner curable resin coating and subjected to conditions of time and temperature sufficient to substantially cure said outer coating while the inner coating remains curable. The particles can be used in a method for treating subterranean formations, which comprises placing in or adjacent to the formation a quantity of the resin coated particle and allowing them to cure into a high strength permeable mass in the formation.

19 Claims, No Drawings

WELL TREATMENT FLUID COMPATIBLE SELF-CONSOLIDATING PARTICLES

This application is continuation of application Ser. No. 08/278,388, filed on Jul. 21, 1994, now abandoned.

The present invention relates to resin coated particles, their use and a method for their manufacture. The improved particulate material of this invention has utility including, but not limited to, use as a proppant in hydraulic fracturing of subterranean formations.

BACKGROUND OF THE INVENTION

In the completion and operation of oil wells, gas wells, water wells, and similar boreholes, it frequently is desirable to alter the producing characteristics of the formation by treating the well or wellbore. Many such treatments involve the use of particulate material. For example, the wellbore is often packed with gravel to maintain production rates. In another application, hydraulic fracturing, particles (propping agents or proppants) are used to maintain the fracture in a propped condition. In hydraulic fracturing, propping agent particles under high closure stress tend to fragment and disintegrate. At closure stresses above about 5000 psi, silica sand, the most common proppant, is not normally employed due to its propensity to disintegrate. The resulting fines from this disintegration migrate and plug the interstitial flow passages in the propped interval. These migratory fines drastically reduce the permeability of the propped fracture.

Other propping agents have been used to increase well productivity. Organic materials, such as the shells of walnuts, coconuts and pecans have been used with some success. These organic materials are deformed rather than crushed when a fracture closes under the overburden load. Aluminum propping agents are another type of propping agent that deforms rather than fails under loading. While propping agents such as these avoid the problem of creating fines, they suffer the infirmity of allowing the propped fracture to close as the proppant is squeezed flatter and flatter with time. In addition, as these particles are squeezed flat the spaces between the particles grow smaller. This combination of decreased fracture width and decreased space between the particles results in reduced flow capacities.

An improved proppant over the materials mentioned above is spherical pellets of high strength glass. These high strength glass proppants are vitreous, rigid and have a high compressive strength which allows them to withstand overburden pressures of moderate magnitude. In addition, their uniform spherical shape aids in placing the particles and providing maximum flow through the fracture. While these beads have a high strength when employed in monolayers, they are less satisfactory in multilayer packs. In brine at 250° F., the high strength glass beads have a tendency to disintegrate at stress levels between 5000 and 6000 psi with a resultant permeability which is no better, if not worse than sand under comparable conditions.

Resin coated particles have been used in efforts to improve the stability of proppants at high closure stresses. Sand or other substrates have been coated with an infusible resin such as an epoxy or phenolic resin. These materials are superior to sand at all stress levels. However, at high temperature and high stress levels, the resin coated particles still show decrease in permeability to an intermediate level above sand.

U.S. Pat. No. 3,492,147 to Young et al. describes a process for producing particulate solid coated with an infusible resin. The particulates to be coated include sand, nut shells, glass beads and aluminum pellets. The resins used include urea-aldehyde resins, phenol-aldehyde resins, epoxy resins, furfuryl alcohol resins and polyester or alkyd resins. These particles are used as proppants in fracturing operations.

U.S. Pat. No. 4,443,347 also describes a method for propping fractures in subterranean formations using proppants comprised of sand particles with a precured phenol formaldehyde resin coating.

U.S. Pat. No. 3,929,191 to Graham et al. discloses a method for producing coated particles for use in treating subterranean formations. Particles in this method are coated with a resin dissolved in a solvent which is then evaporated. The patent also discloses the coating may be produced by mixing the particles with a melted resin and subsequently cooling the mixture, forming a coating of resin on the particles. The Graham patent also discloses that the addition of coupling agents to the system improves the strength of the resin-substrate bond.

Although resin coated sands have proven satisfactory in numerous applications, concern exists over their use under high closure stresses. For example, some self-consolidating, resin-coated particles of the prior art do not develop their full strength until the resin coating has cured in the formation. In the event of rapid closure of the fracture, the proppant could be crushed before the resin cured, resulting in decreased permeability. The use of dual resin coated particles, such as described in U.S. Pat. No. 4,585,064, partially alleviates this problem.

As deeper wells with higher closure stress and harsher conditions are completed, even higher strength proppants are needed. That need is satisfied by the dual resin coated particle having a reinforcing agent interspersed at the inner resin/outer resin boundary as described in our copending application Ser. No. 08/069,929, filed Jun. 1, 1993, now U.S. Pat. No. 5,422,183, issued on Jun. 6, 1995.

Another concern with the use of self-consolidating, resin-coated particle as described above is compatibility with well treatment fluids used to place such particles. In particular, compatibility with hydraulic fracturing fluid is important.

Such fracturing fluids typically are dilute viscous aqueous solutions of synthetic or naturally occurring polymers such as hydroxypropyl guar. To obtain the desired rheological properties the dissolved polymers are typically cross-linked with transition metal cross-linkers such as titanium, zirconium, boron, or the like. To allow easy recovery of the fracturing fluid and to avoid formation damage, so-called breakers are usually added to the fracturing fluid to reduce its viscosity after the formation of the fractures is complete and the proppant has been placed in the fractures.

Maintaining the desired rheological properties during the fracturing operation is important. If the viscosity is not maintained during placement of the proppant, the proppant may settle from the fracturing fluid while still in the well bore resulting in insufficiently propped fractures. On the other hand, if the breakers fail to lower the viscosity after placement of the proppants the formation may be damaged.

Conventional self-consolidating particles have been found to interfere with both the cross-linkers and the oxidative breakers employed. As a result, users of these complex fracturing fluids are reluctant to use conventional self-consolidating proppants. Resin-coated particles with cured coatings avoid these compatibility problems, but do not afford the benefits of a self-consolidating problem.

The present invention alleviates these compatibility problems while maintaining the advantages of a self-consolidating proppant.

SUMMARY OF THE INVENTION

The present invention provides an improved resin coated particle comprising a particulate substrate, an inner coating of a fusible, curable resin and an outer coating of a substantially cured resin. The resin coated particle can be used as a self-consolidating proppant, and is compatible with fracturing fluid. In one particular embodiment, the particle further comprises an additional coating of a substantially cured resin which is located on the exterior of the particulate substrate and inside the inner coating.

The invention also provides an improved method for treating subterranean formations comprising placing in or adjacent to the formation a quantity of the resin coated particle and allowing them to cure into a high strength permeable mass in the formation. In a particular embodiment, the method comprises providing a viscous hydraulic fracturing fluid; injecting the fracturing fluid into the formation at a rate and pressure sufficient to cause the formation to fail in tension, thereby forming fractures in the formation; providing a carrier fluid; mixing the carrier fluid with a high strength, self-consolidating proppant forming a suspension, the proppant having an inner coating of a curable resin and an outer coating of a substantially cured resin; injecting the suspension into the fractures; lowering the pressure in the formation, thereby causing the fractures to close on the proppants and applying overburden stress to the proppants; applying sufficient overburden stress to the proppants to rupture the outer coating of substantially cured resin and releasing the inner coating of curable resin; and providing sufficient time for the curable resin to cure, thereby forming permeable consolidated masses of high strength, self-consolidating proppants.

The present invention also provides an improved method for producing a free flowing dual resin coated particle. These improved resin coated particles are produced by providing a particulate substrate, and forming an inner coating on the substrate with a first curable resin. A second or outer coating of a second curable resin is then coated over the inner curable resin coating and subjected to conditions of time and temperature sufficient to substantially cure said outer coating while the inner coating remains in a fusible, curable state. If an additional coating of resin is included, it is located on the exterior of the particulate substrate and inside the inner coating, and this additional coating is substantially cured before the inner coating is applied.

DESCRIPTION OF THE INVENTION

The present invention combines the well treatment fluid compatibility advantages of precured resin coated particle with the strength and resistance to migration of self-consolidating proppants. This unexpected combination of properties is achieved by creating a particle with a thin cured resin coating that is compatible with fracturing fluids encapsulating an inner coating of a curable resin. Such particles have surprisingly been found to not affect fracturing fluid properties and still consolidate into a strong permeable mass when subjected to downhole conditions. While not wishing to be bound to any particular theory of action, the inventors believe that the outer cured coating effectively encapsulates the reactive inner resin thereby preventing any interaction between it and the fracturing fluid components. Upon being subjected to overburden stress, it is believed that the outer cured coating ruptures allowing the inner coating to melt and coalesce with the inner coating of adjacent proppant particle and then cure into a high strength permeable mass.

Substrate

The present invention can be carried out with any suitable substrate. Choice of the particulate substrate is governed by the properties required by the particular application. One advantage of the invention is that conventional frac sand can be rendered superior to the more expensive manufactured proppants.

For example, in the oil and gas industry extremely high strength proppants are needed to hold open formation fractures created by hydraulic fracturing. In such an application, the present invention may use spherical glass beads as the particulate substrate. Such beads are available commercially in a variety of mesh sizes. For example, Union Carbide Corporation supplies vitreous, rigid, inert, substantially spherical pellets under the trade name UCAR props. Such beads, while of extremely high strength when employed in monolayers are less satisfactory when placed in multilayer packs. These beads when resin coated by the process of this invention and then cured in place yield a permeable mass of higher compressive strength than either the beads alone or resin coated beads of the prior art. Beads from about 6 to about 200 mesh are generally used. In extreme environments where stresses are very high, sintered bauxite, aluminum oxide, and ceramics such as zirconium oxide and other mineral particulates may be coated. Particles from 6 to 100 mesh are generally used. (All reference to mesh size in the claims and specification are to the U.S. standard sieve series).

Also suitable for use as substrates are various organic materials such as walnut and pecan shells, synthetic polymers such as nylon, polyethylene and other resin particles. Metallic particles such as steel and aluminum pellets can also be coated.

Conventional frac sand is the preferred particulate substrate of the invention. Silica sand of about 6 to 100 mesh (U.S. standard sieve) is generally used. One of the principal advantages of the instant invention is that frac sand coated by the method of this invention is as strong or stronger than the more expensive proppants described above. Just as importantly, in conditions where extreme stresses are expected the usable range of such high stress proppants as bauxite and the other ceramics can be extended by following the teachings of this invention. The utility of conventional frac sand can be extended into high stress applications by first coating the sand with a cured coating. This resin coated sand is then used as the substrate and the two additional resin coats are applied as described below. Such particles exhibit the enhanced properties of dual-coated proppants described in U.S. Pat. No. 4,585,064, which is hereby incorporated by reference, and the frac fluid compatibility of the instant invention.

Resins

Resins suitable for the inner and outer coatings are generally any resins capable of being coated on the substrate and then being cured to a higher degree of polymerization. Examples of such resins include phenol-aldehyde resins of both the resole and novolac type, urea-aldehyde resins, melamine-aldehyde resins, epoxy resins and furfuryl alcohol resins and copolymers of such resins. The resins must form a solid non-tacky coating at ambient temperatures. This is required so that the coated particles remain free flowing and so that they do not agglomerate under normal storage conditions.

The preferred resins are the phenol-formaldehyde resins. These resins include true thermosetting phenolic resins of the resole type and phenolic novolac resins which may be rendered heat reactive by the addition of catalyst and formaldehyde. Such resins with softening points of 185° to 290° F. are acceptable.

The inner and outer coatings can be formed starting with the same or different type of resins. For example, the inner coating could be produced from a novolac and the outer coat from a resole. Regardless of the type of resin used, the outer resin must be curable at conditions that leave the inner coating curable, i.e., fusible and heat reactive.

A coupling agent as subsequently described is preferably incorporated during manufacture into the resin that is to be used as the inner coating, and may optionally also be incorporated into the resin that is to be used as the outer coating. The coupling agent which has a functional group reactive in the resin system is added in an amount ranging from about 0.1 to 10% by weight of the resin. The preferred range is from about 0.1 to 3% by weight of the resin. When using the preferred phenol formaldehyde resins, the coupling agent is incorporated into the resin under the normal reaction conditions used for the formation of the phenol-formaldehyde resin. The coupling agent is added to the resin after the phenol formaldehyde condensation reaction has occurred and the resin has been dehydrated to the final free phenol and melt viscosity range.

Inner Resin Coat

The preferred resin of the inner coating to be used with the method of the present invention is a phenolic novolac resin. Particularly suitable are phenolic novolac resins manufactured by Georgia Pacific, known as 99NO7, and by OxyChem, known as 24–715. The GP-099N07 resin has a softening point range of 85°–100° F. The OxyChem 24–715 exhibits a softening point range of 70°–87° F. When either resin is used, it is necessary to add to the mixture a cross-linking agent to effect the subsequent curing of the resin. Hexamethylenetetramine is the preferred material for this function as it serves as both a catalyst and a source of formaldehyde.

Additives and process steps to minimize storage and handling problems have been described. For example, U.S. Pat. No. 4,732,920, to Graham and Sinclair, which is hereby incorporated by reference, describes the addition of calcium stearate to prevent sintering and mineral oil to prevent dust problems as well as other additives.

The coupling agent to be employed is chosen based on the resin to be used. For phenolic resins, the coupling agents include amino, epoxy, and ureido organo silanes. Epoxy modified gamma-glycidoxypropyltrimethoxysilane has given excellent results when used in the amount of 0.50–1.00% based on the weight of the resin. The use of coupling agents as incorporated into the resin and as applied directly to the particulate substrate is discussed in Graham et al U.S. Pat. No. 4,518,039 which is hereby incorporated by reference.

Outer Resin Coat

The outer coat of resin is formed from a heat curable resin coating formed over the inner resin. As stated previously, this outer resin must be curable at conditions that do not completely cure the inner coating thus leaving the inner coating curable. The preferred resins for the outer coating are of the resole type. Particularly suitable is a fast curing resole resin manufactured by Georgia Pacific known as 102N68. Resole resins generally are provided dissolved in a methanol and water solution as is Georgia Pacific 102N68. The resin exhibits an extremely fast cure having a 150° C. hot plate cure time of 30 seconds or less. The preferred resole should be in a solution of water and methanol as the solvent system. The organic solids level should be 65–75%, with a water content in the 5–15% level. The hot plate cure time at 150° C. should be in the range of 25–40 seconds.

Coating Process Parameters

The inner and outer resin coatings may be formed by a variety of methods. For example, the solvent coating process described in U.S. Pat. No. 3,929,191, to Graham et al., hereby incorporated by reference, may be used. Other processes such as that described in U.S. Pat. No. 3,492,147 to Young et al. describes the coating of a particulate substrate with a liquid, uncatalyzed resin composition characterized by its ability to extract a catalyst or curing agent from a non-aqueous solution. As stated above, the preferred resins for use with the instant invention are phenol-formaldehyde novolac resins. When using such resins the preferred coating method is a hot melt coating procedure for the inner coat. Such a procedure is described in U.S. Pat. No. 4,585,064, to Graham et al. which is hereby incorporated by reference. Solvents are preferably used to apply the outer coat. The following is a discussion of typical coating process parameters using the preferred phenol-formaldehyde novolac resins.

The improved high strength particles of the invention are manufactured in a multi-step process. In the first step a phenol-formaldehyde resin inner coat is formed over the particulate substrate. In the second step an outer coating is formed. The outer coating is then cured at conditions that leave the inner resin curable.

Formation of Inner Coating

The first or inner coating of resin is formed on the particulate substrate by first coating the heated substrate with a phenol-formaldehyde novolac resin. This coating is carried out by preheating the particulate substrate to a temperature above the melting point of the particular resin used.

Typically the particulate substrate is heated to 350° to 500° F. prior to resin addition. The heated substrate is charged to a mixer or muller where generally from about 1% to about 6%, by weight of substrate, resin is added. The preferred amount of resin based on the weight of substrate is about 2%.

After completion of addition of the resin to the substrate, the substrate and melted resin are allowed to mix in the muller for a time sufficient to insure the formation of a uniform coating of resin on the sand, usually about 10 to about 30 seconds.

Following this mixing step from about 5 to about 25%, by weight of the resin, of hexamethylenetetramine is added to the substrate resin mixture. The preferred amount of hexamethylenetetramine is about 13% by weight of the resin. After addition of the hexamethylenetetramine the entire mixture is allowed to mull for approximately one minute. Then water is added to quench the reaction of the inner resin coating. The amount of water added and the timing of its addition is adjusted to quench the curing of the inner resin while maintaining sufficient heat in the proppant to cure the outer coating that is added next.

Formation of Outer Coating

The outer resin is then coated over the inner resin and allowed to substantially cure. Substantially cured, as used herein, is to be interpreted as meaning that the cross-linking reaction of the resin is substantially complete and that at typical downhole temperatures only minimal additional curing takes place. When the outer coating is the preferred resole, its addition is preferably carried out by adding it as a solution in a water/methanol mixture comprising between 15–30% methanol and 5–15% water. The preferred composition is 6% water and 25% methanol.

As can be appreciated, a key to preparing the proppant of the present invention is precise control of the heat and mass balance to ensure that a cured outer coating encapsulates a still curable inner resin coating. A more detailed procedure is provided below for specific resins and substrate. One skilled in the art will recognize that batch size, equipment used, and resins and substrate selected will affect process conditions. Initial process temperature, process intervals, amounts of quench water added and amounts of solvent are all interrelated and may be manipulated to arrive at an optimal process. Although experimentation may be required, optimization is within the level of skill in the art once the inventive concept is understood.

EXAMPLE 1

Laboratory experiments were carried out to optimize the resole to novolac ratio so that the resulting self-consolidating proppant achieved compatibility toward persulfate breakers and fracturing fluid cross-linkers and achieved acceptable compressive strength. Proppant samples with the following resole to novolac ratios were prepared in the laboratory and each sample was tested for compressive strength and persulfate demand.

| Sample | Inner Coating (Novolac) (Georgia Pacific 99N07) | Outer Coating (Cured Resole) (Georgia Pacific 102N68) |
| --- | --- | --- |
| 1 | 2.5% | 0.5% |
| 2 | 2.0% | 1.0% |
| 3 | 1.5% | 1.5% |
| 4 | 1.0% | 2.0% |
| 5 | 0% | 3.0% |

The following procedure was used to prepare the laboratory samples: 2000 grams of washed Ottawa sand having a range of 20–40 mesh was heated in an electric forced air oven at a temperature of 400° F. The heated sand was placed in a stainless steel five gallon Hobart mixer equipped with a stainless steel paddle mixing blade. 40 grams of GP-099N07 flake novolac resin was added to the hot sand and mixed at medium speed for 30 seconds. After this time, a hexa/water solution consisting of 6 grams of hexa (hexamethylenetetramine) and 30 grams of water was added to the resin-sand mixture. The resin-sand-hexa-water mixture was mixed for an additional 15–20 seconds. After this time, 13–93 grams of GP-102N68 at 75% solids was added to the resin-sand mixture in the mixer. An additional mix time of 200–230 seconds was allowed to let the resole resin cure on the outer layer of the resin coated sand. The process was considered complete when the sand became free flowing in the mixer. The coated sand was discharged from the mixing bowl and allowed to cool before testing.

The following tests were performed on the laboratory samples of self-consolidating proppants.

Compressive Strength Testing: A slurry was formed by mixing an 80.00 g sample of proppant with 200 ml of a 2% KCl/DI water solution. The slurry was mixed with a magnetic stirrer for 15 minutes. The slurry was then transferred to a modified crush cell, and the excess liquid was allowed to leak off. The cell was placed on a Dake hydraulic press which had been heated to 200° F. The press was ramped 100 psi per minute to a 1000 psi closure. Once 1000 psi closure had been achieved, the cell was subjected to 1000 psi and 200° F. conditions for one hour. After one hour, the mass of consolidated proppants was carefully removed from the cell and allowed to cool. After cooling, the consolidated proppant sample was placed on a Carver hand press and with smooth even strokes, the sample was subjected to an increasing closure stress. The compressive strength was recorded at the point where catastrophic failure of the mass of consolidated proppants occurred.

Persulfate consumption testing (Breaker compatibility): A solution was formed by mixing 50.00 g of sample proppant, 50.00 ml of DI water, and 50.00 ml of a 7.63 g/l ammonium persulfate solution in a sealable Pyrex jar. The jar was shaken vigorously for 30 seconds and then placed in a water bath at 160° F. for one hour. Before analysis, the jar was shaken gently to incorporate any condensation that had formed on the sides of the jar. The liquid was separated from the proppant sample and the liquid was passed through filter paper. A 50.00 ml aliquot of the filtered liquid was pipetted into a flask for titration. Approximately 25 ml of one molar sulfuric acid and 5.00 g of potassium iodide were added to the liquid, forming a precipitate. The flask was then swirled until the precipitate dissolved. The reaction was allowed to digest for one hour. Over the course of that hour, the solution's color changed from yellow to dark red. The reaction signified by the color change produces one molecule of iodine for every molecule of persulfate and subsequently, the iodine may be titrated. After digestion, the solution was titrated against 0.1M sodium thiosulfate. Over the course of the titration, the dark red solution begins to turn pale. Near the end point, the liquid becomes bright yellow and at that time, 1 ml of a starch/potassium iodide solution was added to make the end point more distinct. The titration was then carried out until a clear end point was reached.

The following are the results reported for the experiments described above:

| Sample | |
| --- | --- |
| | Compressive Strength (psi) |
| 1 | 640 |
| 2 | 1210 |
| 3 | 2230 |
| 4 | 1970 |
| 5 | 0 |
| | Persulfate Remaining as Compared to a Blank |
| 1 | 97.1% |
| 2 | 98.7% |
| 3 | 98.4% |
| 4 | 97.2% |
| 5 | 93.8% |

Adequate compressive strengths were achieved with each of the laboratory samples except for sample 5. Sample 5 contained no curable resin; therefore, no compressive strength was expected from the resulting sample. Sample 3 yielded the highest compressive strength, 2230 psi. Samples 2 and 3 consumed very small amounts of persulfate, 98.7% and 98.4%, respectively. The optimal resole to novolac ratio was determined to be that embodied in sample 3, 1–1/2% resole to 1–1/2% novolac based on its high compressive strength and low persulfate consumption.

EXAMPLE 2

The following example is a description of the production of a plant size experimental batch of resin for the outer coating of particles to be used as proppants.

GP-102N68 was prepared by first adding 75% of the total methanol charge and 75% of the total water charge to a lined 55 gal metal reactor. Next one third of the powdered resole was added. The resole/methanol/water mixture was stirred with a Fawcett Co. model 102A high speed air driven motor equipped with a three inch diameter high shear mixing blade. As the mixture was stirred, the reactor was heated to 45°–40° C. with steam on the reactor jacket. When most of the powdered resole had dispersed in about 20 minutes the second third of the resole charge was added along with the remaining methanol and water charges. Mixing continued until the second charge of resole had dispersed in about 20 minutes. The last third of the resole charge was added and mixing continued for another 30 minutes until the resole had dissolved and dispersed. Following the dispersion of the resole, the solution was filtered through 40 mesh wire cloth into a 55 gal drum and placed in 35°–40° C. storage to cool.

Experimental batches of proppants were prepared using two different procedures, A and B. Procedure A was performed using the following steps:

(1) 1000 lbs of Ottawa 20/40 frac sand was heated to approximately 350° F. in a muller;

(2) about 22 pounds of Georgia Pacific 99N07 novolac resin was added to the muller;

(3) about 7.2 pounds of hexamethylenetetramine cross-linker was added to the muller;

(4) the sand and resin mixture were mulled for approximately 80 seconds;

(5) about 6 pounds of quench water was added to the mixture;

(6) approximately 15 pounds of Georgia Pacific 102N68 fast curing resole resin was added; and (7) mulling was continued until "breakdown" (separation of grains) and the material was then discharged from the muller, and the material was held at temperature for several additional minutes.

Procedure B was the same as A except that in step (7) the material was not held at temperature for additional time after breakdown and discharge.

Proppant samples prepared by the two different procedures, A and B, were intended to be tested to determine the relative amount of resin coating on the sand, the compressive strength, and for persulfate consumption. Testing for compressive strength and persulfate consumption were done in the same manner as described in Example 1.

The proppants prepared by procedure A were unacceptable as they had zero compressive strength. It was determined that during procedure A, the novolac inner coat had completely cured because the batch was held at high temperature for too long.

The following procedure was used to determine the relative amount of resin coating on the sand.

Loss-On Ignition Test: A 5–15 g sample of the resin coated sand was placed in a clean, dry crucible and weighed. The crucible was then placed in a muffle furnace at 1800° F. for two hours. After two hours, samples were removed from the oven and allowed to cool to room temperature. The crucibles were then reweighed and the weight difference reported as the resin content of the sample.

The following are the results reported for the tests performed on the proppant samples:

| Procedure | Compressive Strength (psi) |
|---|---|
| A | 0 |
| B | 670 |

| Procedure | Persulfate Remaining as Compared to a Blank |
|---|---|
| B | 96.3% |
| | Loss-On Ignition |
| B | 3.45% |

The experimental batch produced in the plant test by procedure B had an acceptable compressive strength of 670 psi while persulfate demand was 3.7%. Persulfate demand is defined as one minus persulfate percent remaining.

Formation Treatment

The free-flowing particles as produced by the above method may be used as proppants, gravel or fluid loss agents in hydraulic fracturing, frac packing and gravel packs. In carrying out a hydraulic fracturing operating a fracture is first generated by injecting a viscous fluid into the formation at a sufficient rate and pressure to cause the formation to fail in tension. Injection of the fluid is typically continued until a fracture of the desired geometry is obtained. A carrier fluid having the proppant suspended therein is then pumped into the fracture. The temperature of the carrier fluid during pumping operations will be low so as to prevent premature curing (if curable) of the outer resin coat. The carrier fluid bleeds off into the formation and deposits the propping agent in the fracture. This process is controlled by fluid loss agents which are small aggregate particles which temporarily slow the fluid loss to the formation.

After the proppant is placed, the well is shut in with pressure maintained on the formation. As the pressure within the fracture approaches the normal formation pressure, the fracture walls close in on the proppant and apply an overburden stress thereto. It is believed this stress ruptures the outer coating exposing the curable inner coating. At the same time ambient formation temperature heats the inner resin coating. Initially, the resin fuses and unites at contact areas between contiguous particles or with the formation walls. As the temperature increases the polymerization reaction proceeds until the resin is cured into an insoluble and infusible cross-linked state. The pendular regions between adjacent particles bond the packed particles into a permeable mass having considerable compressive strength.

A more detailed description of the standard industry practices for the use of resin coated particles in hydraulic fracturing and gravel pack completion is disclosed in U.S. Pat. No. 3,929,191 which is hereby incorporated by reference. Details of such applications are well known in the art.

Further modifications and alternate embodiments of the invention will be apparent to those skilled in the art in view of this description. Accordingly, this description is to be considered as illustrative only and for the purpose of teaching those skilled in the art the manner of carrying out the invention. Various modifications may be made in the method. Applicants intend that all such modifications, alterations and variations which fall within the spirit and scope of the appended claims be embraced thereby.

We claim:

1. A self-consolidating proppant for well treatment fluids comprising:

a particulate substrate, having a size between about 6 mesh and about 200 mesh, coated with an inner coating of a fusible curable resin; and an outer coating of a substantially heat-cured resin, where:

the resin of the inner coating is selected from the group consisting of phenol-aldehyde resins, urea-aldehyde resins, melamine-aldehyde resins, epoxy resins, furfuryl alcohol resins, and copolymers of such resins;

the resin of the outer coating is selected from the group consisting of phenol-aldehyde resins, urea-aldehyde resins, melamine-aldehyde resins, epoxy resins, furfuryl alcohol resins, and copolymers of such resins, and the resin of the outer coating is heat-curable at conditions that leave the resin of the inner coating uncured.

2. The proppant of claim 1, further comprising a coupling agent located at least in the inner coating, where the coupling agent is selected from the group consisting of amino, epoxy, and ureido organo silanes.

3. A process for the preparation of a self-consolidating proppant for well treatment fluids comprising:

providing a particulate substrate having a size between about 6 mesh and about 200 mesh;

forming an inner coating on said particulate substrate of a fusible curable novolac resin;

forming an outer coating on said particulate substrate of a heat-curable resole resin; and subjecting the resulting coated particulate substrate to heat downhole in a well sufficient to cure said outer coating while maintaining said inner coating in a curable state.

4. A self-consolidating proppant for well treatment fluids, comprising:

a particulate substrate, having a size between about 6 mesh and about 200 mesh, coated with an inner coating of a fusible curable resin; and an outer coating of a substantially cured resin, where the resin of the outer coating is curable at conditions that leave the resin of the inner coating uncured.

5. The proppant of claim 4, where the particulate substrate is sand.

6. The proppant of claim 4, where the resin of the inner coating is a novolac resin.

7. The proppant of claim 4, where the resin of the outer coating is a resole resin.

8. The proppant of claim 4, further comprising an additional coating of a substantially cured resin which is located on the exterior of the particulate substrate and inside the inner coating.

9. The proppant of claim 4, where the resin of the inner coating is selected from the group consisting of phenol-aldehyde resins, urea-aldehyde resins, melamine-aldehyde resins, epoxy resins, furfuryl alcohol resins, copolymers of such resins, and mixtures thereof.

10. The proppant of claim 4, where the resin of the outer coating is selected from the group consisting of phenol-aldehyde resins, urea-aldehyde resins, melamine-aldehyde resins, epoxy resins, furfuryl alcohol resins, copolymers of such resins, and mixtures thereof.

11. The proppant of claim 4, further comprising a coupling agent located at least in the inner coating, where the coupling agent is selected from the group consisting of amino, epoxy, and ureido organo silanes.

12. A process for the preparation of a self-consolidating proppant for well treatment fluids, comprising:

providing a particulate substrate having a size between about 6 mesh and about 200 mesh;

forming an inner coating on the particulate substrate of a first curable resin;

forming an outer coating on the particulate substrate of a second curable resin, where the second curable resin is curable at conditions that leave the first curable resin uncured;

subjecting the resulting resin-coated particulate substrate to conditions sufficient to substantially cure the outer coating while maintaining the inner coating in a fusible curable state.

13. The process of claim 12, where the particulate substrate is sand.

14. The process of claim 12, where the first curable resin is a fusible curable novolac resin.

15. The process of claim 12, where the second curable resin is a curable resole resin.

16. The process of claim 12, further comprising applying an additional resin coating on the exterior of the particulate substrate and inside the inner coating, the additional resin coating being substantially cured.

17. The process of claim 12, where the first curable resin is selected from the group consisting of phenol-aldehyde resins, urea-aldehyde resins, melamine-aldehyde resins, epoxy resins, furfuryl alcohol resins, copolymers of such resins, and mixtures thereof.

18. The process of claim 12, where the second curable resin is selected from the group consisting of phenol-aldehyde resins, urea-aldehyde resins, melamine-aldehyde resins, epoxy resins, furfuryl alcohol resins, copolymers of such resins, and mixtures thereof.

19. The process of claim 12, further comprising providing a coupling agent such that the coupling agent is located at least in the inner coating, where the coupling agent is selected from the group consisting of amino, epoxy, and ureido organo silanes.

* * * * *